Figure 1:
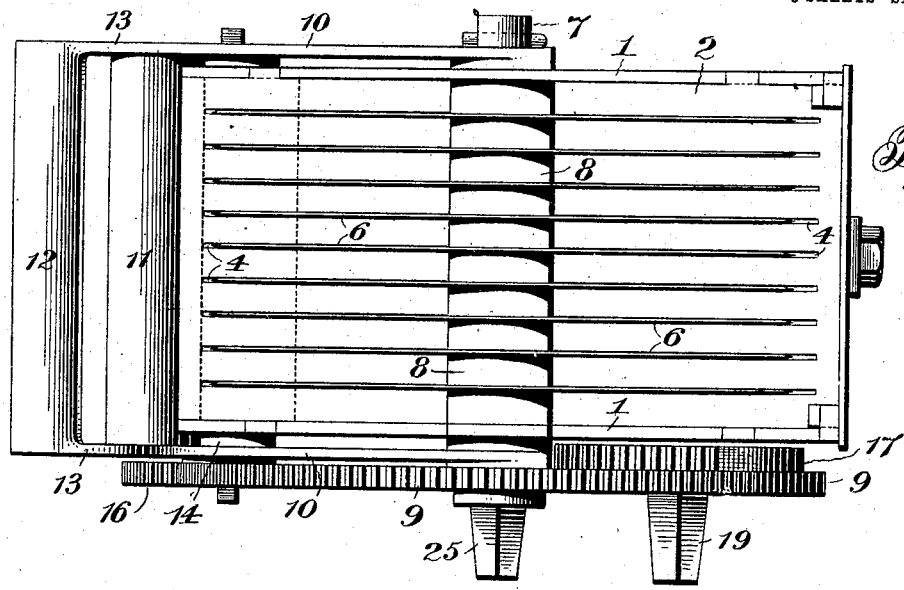

No. 873,256. PATENTED DEC. 10, 1907.
E. E. MOTTER.
FAT CUTTING MACHINE.
APPLICATION FILED JULY 6, 1905.

5 SHEETS—SHEET 1.

Witnesses:
Jas E Hutchinson
F. J. Veihmeyer

Inventor
Elmer Eidemiller Motter
by Edson Bros, Attorneys

No. 873,256. PATENTED DEC. 10, 1907.
E. E. MOTTER.
FAT CUTTING MACHINE.
APPLICATION FILED JULY 6, 1905.
5 SHEETS—SHEET 2.
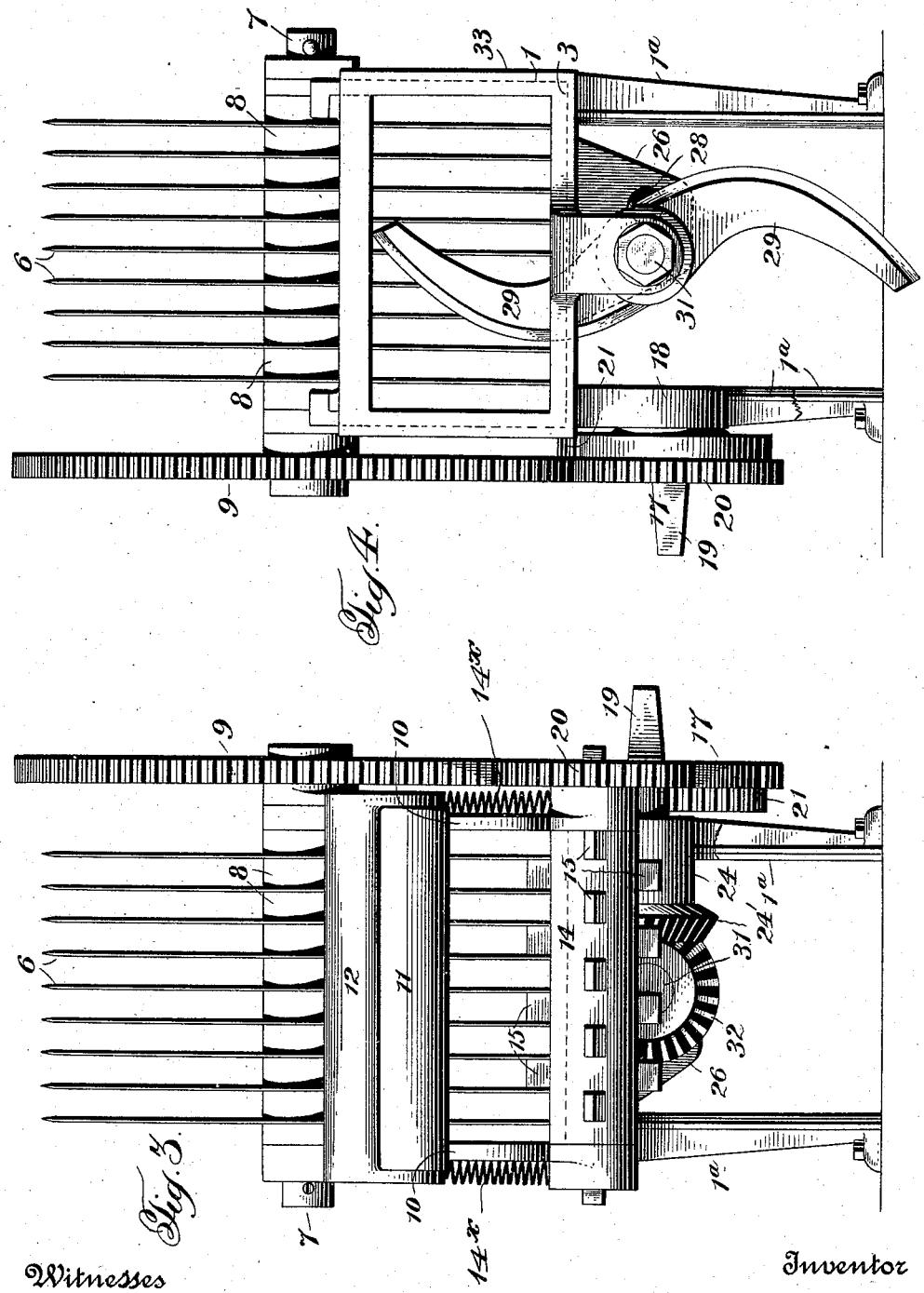

No. 873,256.  
PATENTED DEC. 10, 1907.

E. E. MOTTER.  
FAT CUTTING MACHINE.  
APPLICATION FILED JULY 6, 1905.

5 SHEETS—SHEET 3.

Witnesses:  
Jas. E. Hutchinson  
F. J. Veihmeyer

Inventor  
Elmer Eidemiller Motter  
by Edson Bro's, Attorneys

No. 873,256.　　　　　　　　　　　　　PATENTED DEC. 10, 1907.
E. E. MOTTER.
FAT CUTTING MACHINE.
APPLICATION FILED JULY 6, 1905.
5 SHEETS—SHEET 4.
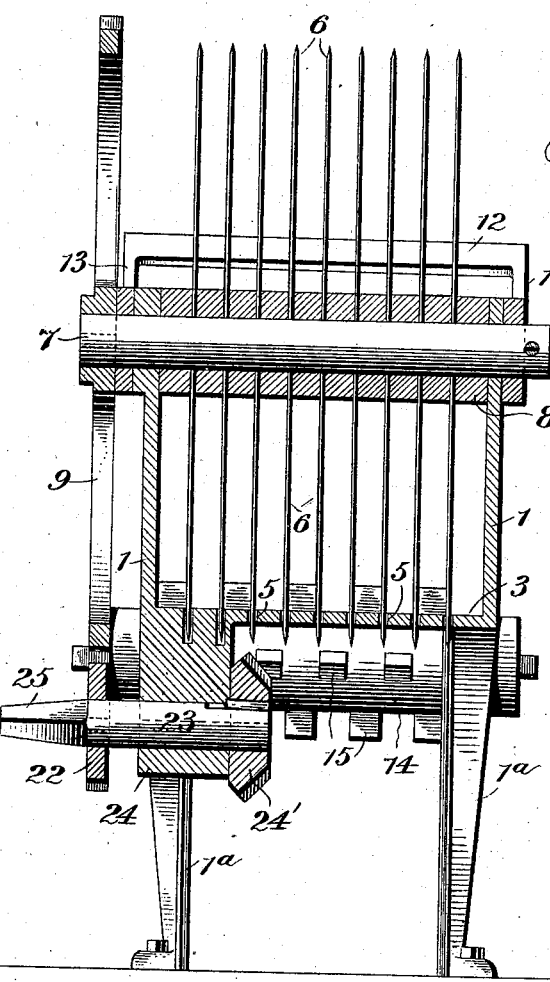
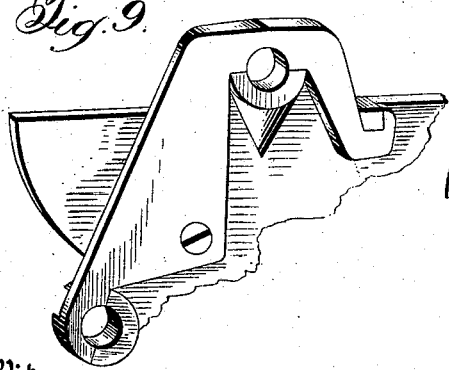
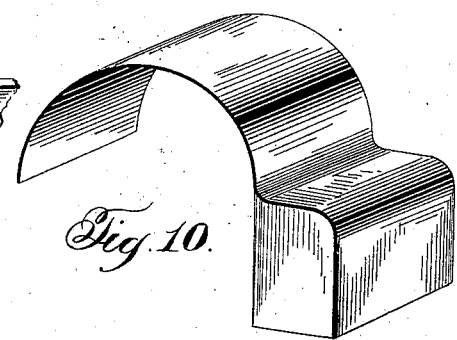
Witnesses　　　　　　　　　　　　　　　　Inventor

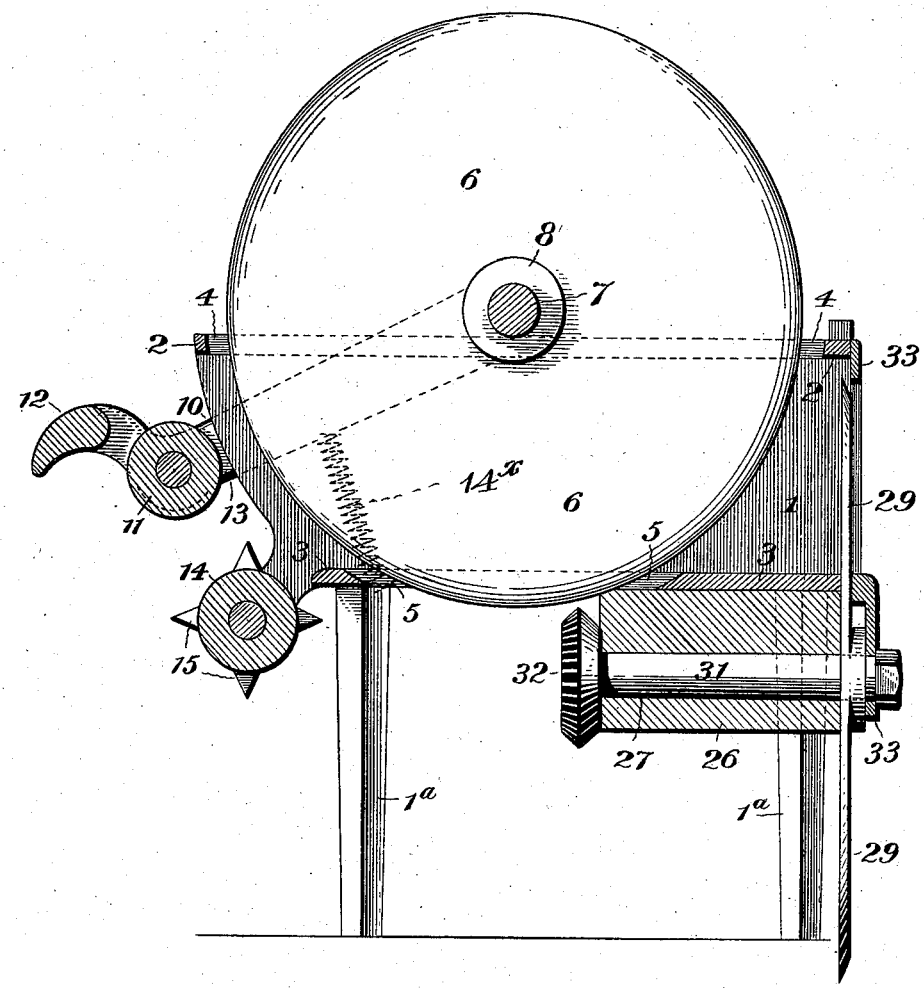

UNITED STATES PATENT OFFICE.

ELMER EIDEMILLER MOTTER, OF TIPPECANOE CITY, OHIO.

FAT-CUTTING MACHINE.

No. 873,256.  Specification of Letters Patent.  Patented Dec. 10, 1907.

Application filed July 6, 1905. Serial No. 268,387.

*To all whom it may concern:*

Be it known that I, ELMER EIDEMILLER MOTTER, a citizen of the United States, residing at Tippecanoe City, in the county of Miami and State of Ohio, have invented certain new and useful Improvements in Fat-Cutting Machines; and I do hereby declare the following to be a full, clear, and exact description of the invention, such as will enable others skilled in the art to which it appertains to make and use the same.

My invention relates to machines for cutting meat and fat, especially adapted for cutting pork fat into small blocks preparatory to extracting lard therefrom.

The work of cutting pork fat by hand into such form that it will render out the maximum amount of lard, is a very uncomfortable and tedious task. When butchering is done in cold weather, this task usually means half frozen hands and cut fingers, to the butchers. The work calls for a machine which, when the fat to be cut is put into contact with the working parts, will automatically feed itself and cut up the same, in the most effective and easy manner, into what experience has shown to be the best form.

These are the principal objects of my invention.

The machine embodying my invention enables the operator to do six times as much work as a skilled butcher can do by hand. At the same time the work is performed with a uniformity, comfort and efficiency impossible by hand. While I have embodied in this machine movements of the knives similar to those used by an experienced workman in handling his knife when doing the task by hand, every precaution has been taken to make this machine a model of the utmost simplicity, neatness and durability, and to render it an easy running and easily managed machine whose dangerous parts are guarded to prevent injury to the operator.

The invention consists in the features of construction and combinations of parts of the machine as described herein and more particularly set forth in the claims concluding this specification.

Figure 2:
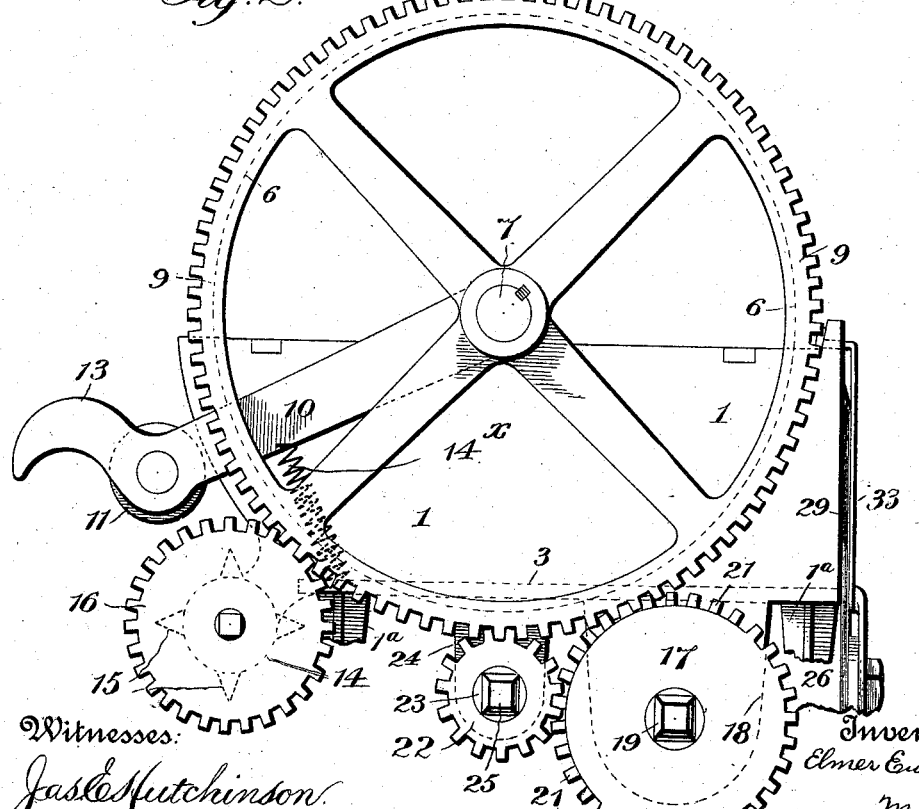
Figure 5:
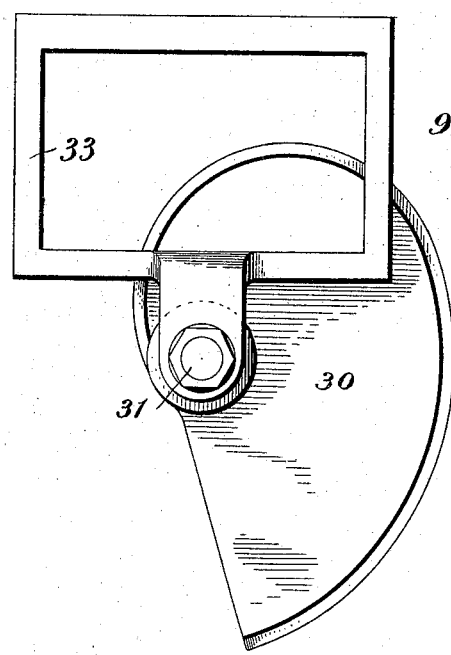
Figure 6:
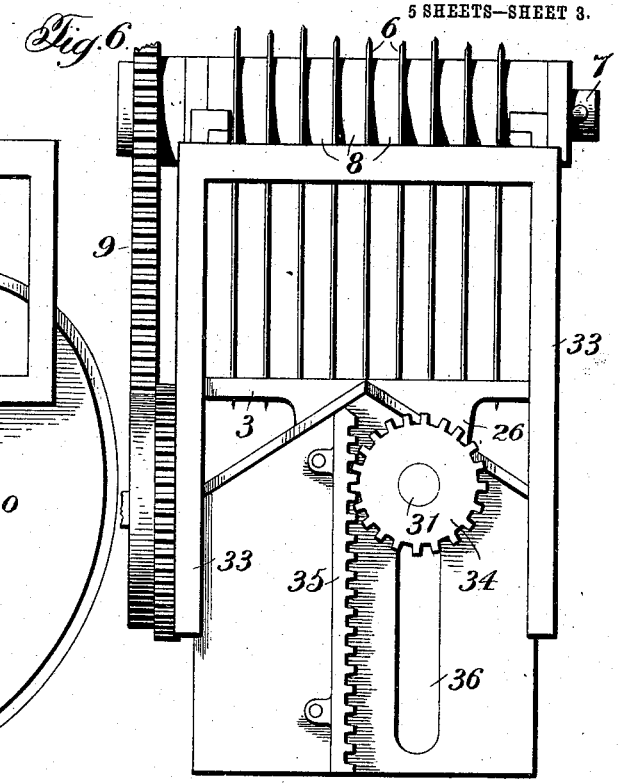
Figure 7:
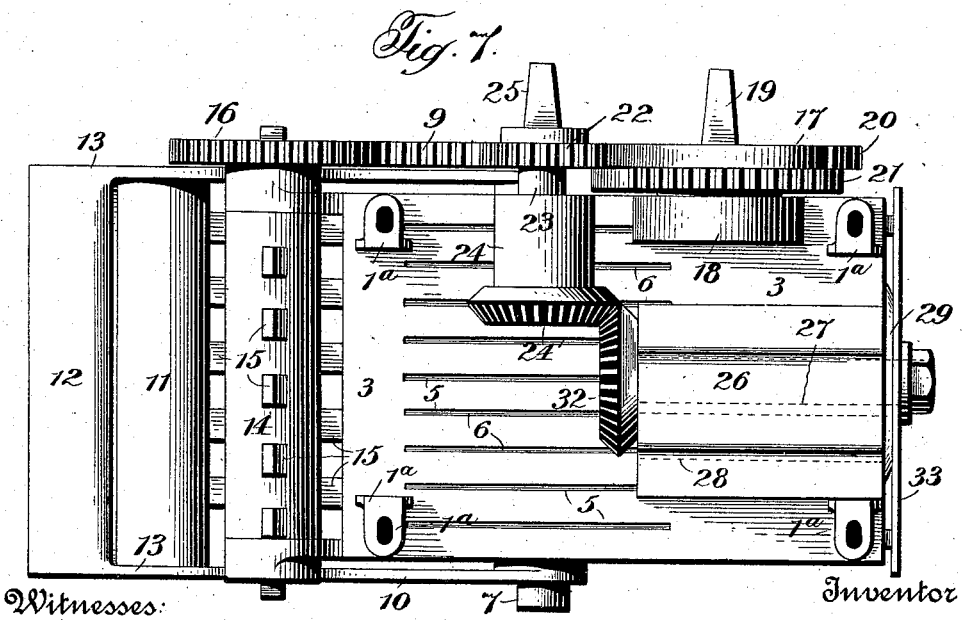

In the accompanying drawings illustrating the preferred embodiment of my invention: Figure 1 is a plan view of the machine, the cover being removed. Fig. 2 is a side elevation, the cover shown in dotted lines. Fig. 3 is an elevation of the feed end of the machine. Fig. 4 is an elevation of the discharge end with the double bladed cross cut knife in place. Fig. 5 is a detail view of a cam-shaped cross cut knife and the frame therefor. Fig. 6 is a similar view with a pinch knife secured thereto. Fig. 7 is a bottom plan view. Fig. 8 is a vertical cross-sectional view taken through the center of the circular knives. Fig. 9 is a detail view of a construction for providing open bearings for the circular-knife shaft and the feeder shaft, Fig. 10 is a detailed perspective view of a cover for the circular knives. and Fig. 11 is a vertical sectional view on the median line of Fig. 4 showing the feed.

While the preferred embodiment of my invention is illustrated in the accompanying drawings and its construction and operation are described in this specification, the right is reserved to make such changes from the constructions shown and described herein as the scope of the claims hereto appended will permit.

In carrying out my invention I provide a casing or box provided with upper and lower plates each having a series of slots in which are arranged a series of circular knives mounted on a common shaft extending across the upper plate and carrying a gear wheel on its end. The lower portion of one end of the box or casing is rounded off to conform to the arc of the circular knives. A feed roller having staggered projections is hung just below the level of the bottom plate of the casing, where it is rounded off, and carries a gear meshing with the gear on the circular-knife shaft. Above said feed roller is arranged a presser roller under the influence of any convenient form of spring and mounted in a swinging frame hung from the main cutter shaft and having a handle portion whereby it may be pressed upon the fat being fed into the machine and hold it against the feed roller. At the discharge end of the casing is arranged a knife adapted to move across the vertical plane of the discharge opening and cut the slices cut by the circular knives into blocks. Various forms of knives may be used for this cross-cutting, three of which I have shown. The double armed knife and the cam-shaped knife shown in Figs. 4 and 5 respectively, are operated continuously with the circular knives by means of shafts and gears connected up with the gear of the main cutter shaft. The pinch knife, shown in Fig. 6, is operated alternately with the circular knives by means of a double gear with interrupted teeth adapted to mesh alternately with the circular cutter gear and gear for operating said pinch knife.

Referring more particularly to the drawings, 1 is the casing or box, supported upon legs, 1a, and having the upper and lower horizontal plates 2, 3, the latter forming the bottom of said casing, provided respectively with slots 4 and 5, in which are arranged the circular knives 6. Said knives are mounted on the shaft 7, and are separated and held the requisite distance apart by collars 8. The large gear wheel, 9, is keyed on the end of said shaft, 7, and the swinging frame, 10, carrying the presser roller, 11, and having the hand bar, 12, is hung therefrom by the lateral arms, 13. The feed roller, 14, provided with the staggered lugs or projections, 15, is mounted along the lower edge of the feed end of the casing and carries a gear, 16, meshing with the gear wheel 9. Said presser roller is preferably held down by springs 14× shown in Figs. 2, 3 and 11.

A double gear with interrupted teeth, 17, is mounted on a stud or pin on a lug, 18, on the bottom plate of the casing and has a crank-engaging central lug, 19, whereby it is operated. The outer series of teeth, 20, on said double gear is adapted to mesh with the gear wheel, 9, and the inner series, 21, meshes with a gear, 22, mounted on a longitudinally movable shaft, 23, bearing in a lug, 24, on the bottom plate of the casing. Said gear, 22, is also provided with a crank-engaging lug, 25. As said shaft, 23, is slidable in its bearing, the gear, 22, may be arranged to mesh either with the inner series of teeth on the double gear with interrupted teeth or with the gear wheel, 9. Said shaft, 23, carries a beveled pinion, 24¹ on its inner edge, said pinion being splined to said shaft to permit of the longitudinal movement of the latter without changing the position of said pinion. A third plate 26, on the bottom of the casing is provided with two parallel bearings, one 27, midway of said casing, and the other, 28, a little to one side thereof. When either the double-arm knife, 29, or the cam-shaped knife 30 is used, the shaft 31, carrying a beveled pinion 32, meshing with the pinion 24¹, is arranged in the bearing 27 and the knife is fastened to the outer end of said shaft and works behind a frame, 33, suitably secured to the discharge end of the casing. When either of these knives are used, the gear 22, is brought into engagement with the gear wheel 9, and power is applied by means of a crank engaging the lug 25, so that said cross-cut knife is operated continuously with the circular knives. When the pinch knife is used, the shaft 31, is placed in the bearing 28, and a gear, 34, is put on its outer end. Said gear 34 meshes with a rack bar 35, secured centrally of the knife which is provided with a vertical slot 36, for the shaft. When this form of knife is used, the gear 22 is pushed back out of engagement with the gear wheel 9, and into engagement with the inner series of teeth 21 on the double gear 17. The handle is then connected to the lug 19 on said double gear, which, when revolved, will alternately turn the gear wheel 9, by means of the outer series of teeth 20 meshing therewith, and the gear 22 by reason of engagement thereof by the inner series of teeth 21. The revolution of the gear wheel 9 actuates the circular knives and slices a portion of the fat which is then cut off transversely into rectangular pieces by the pinch knife actuated by means of the shaft 23, the beveled gears 24¹ and 32, the shaft 31 and gear 34 when the gear 22 is revolved. When said gear 22 is released from engagement with the inner series of teeth 21 on the double gear 17 with the interrupted teeth, which double occurs when the end of said series of teeth is reached, the pinch knife drops by gravity to a point below the lower plate 3, turning back the shafts 31 and 23 and the gears carried thereby. In this way the rotary knives and the pinch knife are alternately actuated to first slice the fat and then cut the slices into blocks, said fat being fed in at the inlet end of the machine by the feed roller against which it is held by the presser roll. When the double-armed knife or the cam-shaped knife is used, it and the slices may be run at the same time, as heretofore described, because the ends of the slices may be run out beyond the discharge end of the casing in readiness to be cut off by the cross cut knife while said cross-cut knife is below the bottom of the casing. The cam-shaped knife may also be actuated alternately with the slicing knives, in the same manner as the pinch knife. In Fig. 9 I have shown a simple construction whereby the bearings for the circular-knife shaft and the feed roller may be opened to permit of the removal of said circular knives and feed roller to clean the machine, sharpen the knives, etc.

The small amount of power required to operate my machine, and the great amount of time saved by its use, and the superiority of its output over that possible by hand, as well as its other advantages, greatly recommend it to butchers and farmers. The production of the machine in its perfected form with all the necessary attachments etc, is the ultimate result of a long and detailed series of experiments and tests, carried on in the line of business to which it relates. The machine has therefore been found to do the work of cutting all grades of skin bearing fat, from the tenderest to the toughest, in the shortest possible time, in the neatest and easiest possible manner, and with the greatest degree of economy in every way.

Having thus described my invention, what I claim as new and desire to secure by Letters Patent is:

1. In a machine of the character described, the combination with a series of circular revoluble slicing knives, of a feed roller adapted to automatically feed material to said knives as the latter are being operated, and a presser roller mounted in a frame pivoted on the slicing knife shaft and adapted to press the material into engagement with the feed roller.

2. In a machine of the character described, the combination, with a casing having a slotted top plate and a slotted bottom plate, of a series of circular revoluble slicing knives mounted on a shaft arranged just above said top plate, each knife arranged in one of the slots in the top plate and extending into one of the slots in the bottom plate, a cross cut knife adapted to pass across the discharge end of said casing, and means to actuate said knives.

3. In a machine of the character described, the combination with a casing, a series of slicing knives mounted on a common shaft, a gear wheel on said shaft, a cross-cut knife arranged to move across the discharge end of the casing, a gear for operating said cross-cut knife, a double interrupted gear pivoted to the casing and having one row of teeth adapted to mesh with the gear wheel on the slicing knife shaft and another row of teeth adapted to mesh with the cross-cut knife operating gear, and means to actuate said double gear whereby the material is sliced and the slices cut into blocks continuously.

4. In a machine of the character described, the combination with a casing, a series of slicing knives mounted on a common shaft, a gear wheel on said shaft, a cross-cut knife arranged to move across the discharge end of the casing, a gear for operating said cross-cut knife, a double gear with interrupted teeth pivoted to the casing, and having one of its rows of teeth adapted to mesh with the gear wheel on the slicing knife shaft; said cross-cut knife operating gear mounted on a slidable shaft whereby it is adapted to engage the gear wheel on the slicing knife shaft or the inner row of teeth on said double gear.

5. In a machine of the character described, the combination with a casing, a series of slicing knives mounted on a common shaft, a gear wheel on said shaft, a feed roller carrying a gear meshing with said gear wheel, a cross-cut knife arranged to move across the discharge end of the casing, a gear for operating said cross-cut knife, a double interrupted gear pivoted to the casing and having one row of teeth adapted to mesh with the gear wheel on the slicing knife shaft and another row of teeth adapted to mesh with the cross-cut knife operating gear, and means to actuate said double gear whereby the material is sliced and the slices cut into blocks continuously.

6. In a machine of the character described, the combination, with a casing, a series of slicing knives mounted on a common shaft, and means to operate said shaft, of a feed roller, arms pivoted on said slicing knife shaft and having a handle bar extending between them, a presser roller mounted between said arms, and springs arranged between said arms and stationary parts of said casing for the purpose specified.

In testimony whereof, I affix my signature, in presence of two witnesses.

ELMER EIDEMILLER MOTTER.

Witnesses:
J. H. POHLMAN,
GEO. W. HENKE